United States Patent
Yamada

(10) Patent No.: US 11,780,500 B2
(45) Date of Patent: Oct. 10, 2023

(54) CONTROL DEVICE, MANAGER, METHOD, NON-TRANSITORY STORAGE MEDIUM, AND VEHICLE

(71) Applicant: TOYOTA JIDOSHA KABUSHIKI KAISHA, Toyota (JP)

(72) Inventor: Yoshihisa Yamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 296 days.

(21) Appl. No.: 17/163,637

(22) Filed: Feb. 1, 2021

(65) Prior Publication Data
US 2021/0237798 A1    Aug. 5, 2021

(30) Foreign Application Priority Data

Feb. 5, 2020    (JP) .................................. 2020-018164

(51) Int. Cl.
*B62D 15/02*    (2006.01)
*B60R 16/023*    (2006.01)

(52) U.S. Cl.
CPC ........ *B62D 15/025* (2013.01); *B60R 16/0231* (2013.01)

(58) Field of Classification Search
CPC .. B62D 15/025; B60R 16/0231; B60W 10/18; B60W 10/10; B60W 10/20; B60W 30/045; B60W 30/06; B60W 30/12; B60W 30/14; B60W 30/09
See application file for complete search history.

(56) References Cited

U.S. PATENT DOCUMENTS

| | | | |
|---|---|---|---|
| 7,096,116 B2 | 8/2006 | Tanaka et al. | |
| 2004/0148093 A1 | 7/2004 | Tanaka et al. | |
| 2012/0109414 A1 | 5/2012 | Kumabe et al. | |
| 2017/0029026 A1 | 2/2017 | Okuda et al. | |
| 2017/0267252 A1* | 9/2017 | Park | B60W 30/14 |
| 2018/0274917 A1* | 9/2018 | Imaki | G01C 3/085 |
| 2019/0300052 A1 | 10/2019 | Allan et al. | |

(Continued)

FOREIGN PATENT DOCUMENTS

| | | |
|---|---|---|
| CN | 102556149 A | 7/2012 |
| DE | 102008036772 A1 | 2/2010 |

(Continued)

OTHER PUBLICATIONS

U.S. Appl. No. 17/193,329, filed Mar. 5, 2021 in the name of Masumi Dakemoto et al.
Feb. 17, 2023 Office Action issued in U.S. Appl. No. 17/193,329.

*Primary Examiner* — Behrang Badii
(74) *Attorney, Agent, or Firm* — Oliff PLC

(57) ABSTRACT

A control device mounted on a vehicle including one or more processors. The one or more processors are configured to receive a plurality of first requests from a driver assistance system. The one or more processors are configured to arbitrate the first requests. The one or more processors are configured to calculate a second request that has a physical quantity different from that of the first request, based on an arbitration result. The one or more processors are configured to distribute the second request to at least one of a plurality of actuator systems. The one or more processors are configured to output an actual steering angle of the vehicle to the driver assistance system.

4 Claims, 2 Drawing Sheets

(56) References Cited

U.S. PATENT DOCUMENTS

| | | | |
|---|---|---|---|
| 2020/0070849 | A1 | 3/2020 | Suzuki et al. |
| 2020/0377082 | A1* | 12/2020 | Nassouri ........... B60W 30/0956 |
| 2021/0291821 | A1 | 9/2021 | Dakemoto et al. |

FOREIGN PATENT DOCUMENTS

| | | |
|---|---|---|
| DE | 102009051471 A1 | 5/2011 |
| DE | 102019107768 A1 | 10/2019 |
| JP | H09-311036 A | 12/1997 |
| JP | 2004-286724 A | 10/2004 |
| JP | 2007-203761 A | 8/2007 |
| JP | 2009-276098 A | 11/2009 |
| JP | 2010-058651 A | 3/2010 |
| JP | 2012-096618 A | 5/2012 |
| JP | 2017-030472 A | 2/2017 |
| JP | 2020-032894 A | 3/2020 |

* cited by examiner

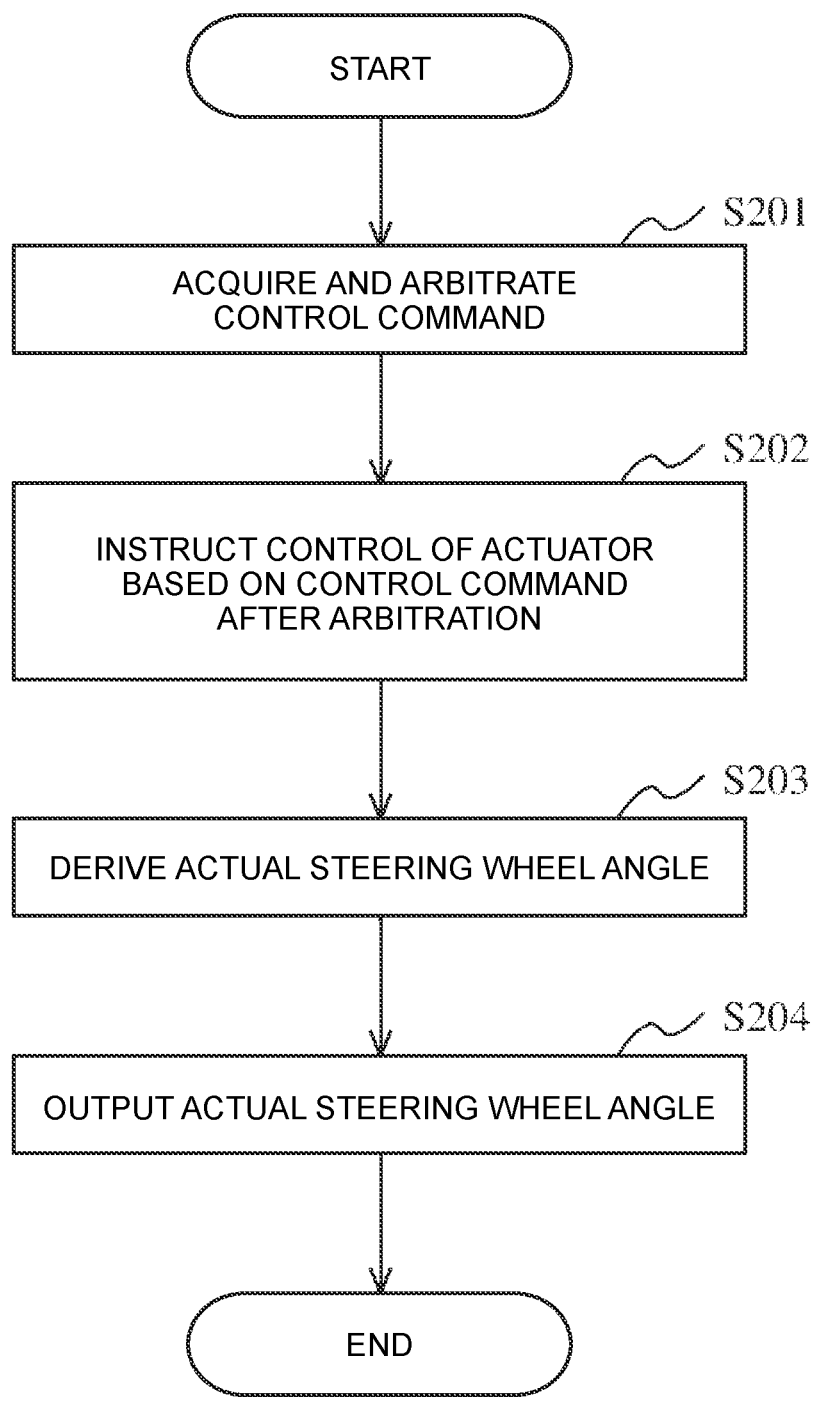

CONTROL DEVICE, MANAGER, METHOD, NON-TRANSITORY STORAGE MEDIUM, AND VEHICLE

CROSS-REFERENCE TO RELATED APPLICATION

This application claims priority to Japanese Patent Application No. 2020-018164 filed on Feb. 5, 2020, incorporated herein by reference in its entirety.

BACKGROUND

1. Technical Field

The present disclosure relates to a control device, a manager, a method to be executed by a computer of a manager mounted on a vehicle, a non-transitory storage medium, and a vehicle.

2. Description of Related Art

A plurality of vehicle driver assistance devices that outputs control commands for controlling movement of vehicles may be mounted on a vehicle to assist a driver in driving the vehicle. A vehicle control device has been proposed that arbitrates control commands from such a plurality of driver assistance devices. For example, Japanese Unexamined Patent Application Publication No. 2017-30472 (JP 2017-30472 A) discloses a vehicle control device that arbitrates a steering command from a collision avoidance assistance device, which is a driver assistance device that assists a user in driving so as to avoid the vehicle from colliding with an obstacle, and a steering command from a lane departure avoidance assistance device, which is a driver assistance device that assists the user in driving such that the vehicle travels within the lanes.

SUMMARY

When the driver assistance device performs steering control with a steering wheel angle serving as a target control amount, it is conceived that the steering control can be improved by acquiring the actual steering wheel angle, which is the current actual steering wheel angle of the vehicle, and using it for the control. However, there is a limit in acquiring the actual steering wheel angle, and thus there is also a limit in improving the steering control.

The present disclosure provides a control device, a manager, a method to be executed by a computer of a manager mounted on a vehicle, a non-transitory storage medium, and a vehicle that can improve steering control of a driver assistance device.

A control device according to a first aspect of the present disclosure includes one or more processors. The one or more processors are configured to receive a plurality of first requests from a driver assistance application. The one or more processors are configured to arbitrate the first requests. The one or more processors are configured to calculate a second request that has a physical quantity different from that of the first request, based on an arbitration result. The one or more processors are configured to distribute the second request to at least one of a plurality of actuator systems. The one or more processors are configured to output an actual steering angle of the vehicle to the driver assistance application.

A manager according to a second aspect of the present disclosure includes one or more processors. The one or more processors are configured to receive a plurality of kinematic plans from a plurality of ADAS applications. The one or more processors are configured to arbitrate the kinematic plans. The one or more processors are configured to calculate a motion request based on an arbitration result. The one or more processors are configured to distribute the motion request to at least one of a plurality of actuator systems. The one or more processors are configured to output a steering wheel angle of the vehicle to the ADAS applications. In a manager according to the second aspect of the present disclosure, the manager may be mounted on a vehicle.

A manager according to a third aspect of the present disclosure includes one or more processors. The one or more processors are configured to receive a plurality of first requests from a plurality of ADAS applications. The one or more processors are configured to arbitrate the first requests. The one or more processors are configured to calculate a second request that has a physical quantity different from that of the first request, based on an arbitration result. The one or more processors are configured to distribute the second request to at least one of a plurality of actuator systems. The one or more processors are configured to output an actual steering wheel angle of the vehicle to the ADAS applications.

A method according to a fourth aspect of the present disclosure is to be executed by a computer of a manager mounted on a vehicle. The method includes: receiving a plurality of kinematic plans from a plurality of ADAS applications; arbitrating the kinematic plans; calculating a motion request based on an arbitration result; distributing the motion request to at least one of a plurality of actuator systems; and outputting a steering wheel angle of the vehicle to the ADAS applications.

A non-transitory storage medium according to a fifth aspect of the present disclosure stores instructions that are executable by a computer of a manager mounted on a vehicle and that cause the computer of the manager to perform the following functions. The functions include: receiving a plurality of kinematic plans from a plurality of ADAS applications; arbitrating the kinematic plans; calculating a motion request based on an arbitration result; distributing the motion request to at least one of a plurality of actuator systems; and outputting a steering wheel angle of the vehicle to the ADAS applications.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart illustrating a process executed by the vehicle control device of the embodiment.

DETAILED DESCRIPTION OF EMBODIMENTS

Figure 1:
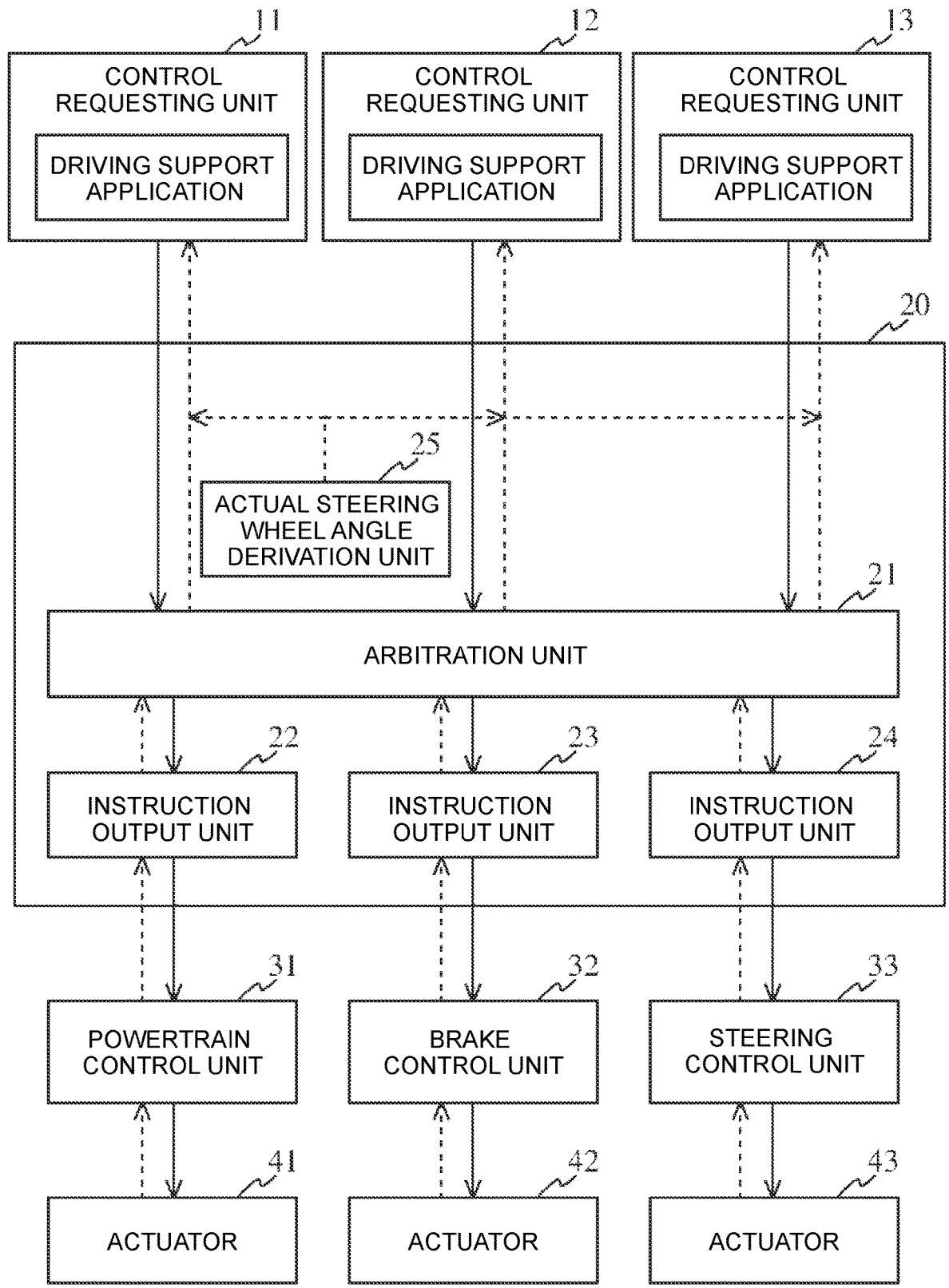
FIG. 1 is a functional block diagram of a vehicle control device and its peripheral components according to an embodiment.

A vehicle control device according to the present disclosure suitably derives an actual steering wheel angle based on a movement state of a vehicle and provides the actual steering wheel angle to a driver assistance device. In order to derive the actual steering wheel angle based on the movement state of the vehicle, it is necessary to perform a relatively high-level calculation based on the characteristics unique to the vehicle. However, the vehicle control device according to the present disclosure eliminates the need for a plurality of driver assistance devices to mount and execute the derivation processes individually. Thus, development cost and processing load can be suppressed.

Embodiment

Configuration

FIG. 1 is a functional block diagram of a vehicle control device 20 and its peripheral components according to an embodiment. The functional blocks illustrated in FIG. 1 include a plurality of control requesting units 11 to 13, the vehicle control device 20, a powertrain control unit 31, a brake control unit 32, a steering control unit 33, and actuators 41 to 43. These configurations are connected via an in-vehicle network such as Controller Area Network (CAN) or Ethernet (registered trademark) so as to communicate with each other. Note that arrows in FIG. 1 schematically show exemplary flows of information, and an actual connection mode of the communication lines is not limited.

The control requesting units 11 to 13 (driver assistance devices) are each configured to execute driving support applications to implement vehicle driving support functions such as autonomous driving, automatic parking, adaptive cruise control, lane keeping assist, and collision mitigation braking. The control requesting units 11 to 13 are realized by a computer such as an electronic control unit (ECU) having a processor such as a central processing unit (CPU) and a memory. The control requesting units 11 to 13 implement different driving support functions from each other and can operate simultaneously. The number of control requesting units mounted on the vehicle is not limited to three as shown in FIG. 1 and may be two or less and four or more. The control requesting units 11 to 13 output control commands for requesting the operations of the actuators 41 to 43. The driver assistance devices (the control requesting units 11 to 13) can be regarded as driver assistance systems or ADAS applications.

Each of the control requesting units 11 to 13 determines a part or all of the controls related to the movement of the vehicle such as "running", "turning", and "stopping" of the vehicle based on each driving support function, and outputs the results as a control command. The control command is, for example, a required value of the movement of the vehicle in the traveling direction for "running" or "stopping", and a required value of lateral movement of the vehicle for "turning". Specifically, the required value of the movement in the traveling direction is represented by, for example, using the acceleration in the traveling direction as the target control amount. Further, the required value of the lateral movement is represented by, for example, using one of a lateral acceleration, a yaw rate, a steering wheel angle, and the like as the target control amount based on the specifications of the driving support application.

The vehicle control device 20 determines the controls related to the movement of the vehicle such as "running", "turning", and "stopping" based on the control commands from the control requesting units 11 to 13. Further, the vehicle control device 20 gives instructions as required to the powertrain control unit 31, the brake control unit 32, and the steering control unit 33 (further, a shift control unit (not shown) that controls the shift position) based on the determined controls. Accordingly, the vehicle control device 20 functions as a movement manager that appropriately controls the actuators 41 to 43 related to the movement of the vehicle, or as a part of the movement manager to control the movement of the vehicle. The vehicle control device 20 may be a device that exclusively controls the lateral movement of the vehicle. The vehicle control device 20 is realized by a computer such as an ECU having a processor such as a CPU and a memory, and includes an arbitration unit 21, a plurality of instruction output units 22 to 24, and an actual steering wheel angle derivation unit 25. The vehicle control device 20 can be regarded as a control device or a manager. The vehicle control device 20 may include a plurality of ECUs, a plurality of processors, and a plurality of memories.

The arbitration unit 21 acquires the control commands output from the control requesting units 11 to 13 (driver assistance devices) and arbitrates the acquired control commands. The control command is an example of a first request and a kinematic plan. The kinematic plan may be a vehicle motion or behavior plan including at least one of a longitudinal acceleration/deceleration, a curvature, a steering angle, and a yaw rate.

As an arbitration process, the arbitration unit 21 selects, for example, one control command from a plurality of control commands acquired based on a predetermined selection criterion, or sets a new control command based on the acquired control commands. The new control command is an example of a second request that has a physical quantity different from that of the first request. Further, the new control command is an example of a motion request. The result of the arbitration process may be fed back from the arbitration unit 21 to the control requesting units 11 to 13. In addition, the arbitration unit 21 may execute the arbitration process based on information indicating operating states of the actuators 41 to 43 and availabilities representing the currently operable performance ranges of the actuators 41 to 43. The information is sent from the powertrain control unit 31, the brake control unit 32, and the steering control unit 33, which will be described later.

Further, based on the control command obtained through the arbitration, the arbitration unit 21 can instruct, via the instruction output units 22 to 24, one of or two or more of the powertrain control unit 31, the brake control unit 32, and the steering control unit 33 to control the movement of the vehicle that is required by the driving support applications. Lateral movement of the vehicle is typically realized by controlling steering of the steering system. The movement of the vehicle in the traveling direction can be realized by controlling generation of braking force by the brake device, and generation of driving force or braking force by the powertrain, individually or in combination. The arbitration unit 21 may give instructions of the control related to the lateral movement of the vehicle based on the information indicating the operating states and the availabilities of the actuators 41 to 43 acquired from the powertrain control unit 31, the brake control unit 32, and the steering control unit 33 via the instruction output units 22 to 24.

The instruction output unit 22 generates instruction information for causing the actuator 41 included in the powertrain to generate a driving force or a braking force based on the control command after the arbitration by the arbitration unit 21. The instruction information generated by the instruction output unit 22 is acquired by the powertrain control unit 31.

The instruction output unit 23 generates instruction information for causing the actuator 42 included in the brake device to generate a braking force based on the control command after the arbitration by the arbitration unit 21. The instruction information generated by the instruction output unit 23 is acquired by the brake control unit 32.

The instruction output unit 24 generates instruction information for causing the actuator 43 included in the steering device to generate a steering angle based on the control command after the arbitration by the arbitration unit 21. The instruction information generated by the instruction output unit 24 is acquired by the steering control unit 33.

The powertrain control unit 31 controls the operation of the actuator 41 that is one of the drive actuators and that constitutes the powertrain, to generate the driving force instructed by the instruction output unit 22. The powertrain control unit 31 is realized by, for example, any one of or a combination of an engine control ECU, a hybrid control ECU, a transmission ECU, etc., depending on the configuration of the powertrain. Although FIG. 1 shows the single actuator 41 that is controlled by the powertrain control unit 31, the number of actuators controlled by the powertrain control unit 31 may be two or more depending on the configuration of the powertrain of the vehicle. Examples of the actuator 41 that constitutes the powertrain include an engine, a drive motor, a clutch, a transmission, and a torque converter. In addition, the powertrain control unit 31 acquires information regarding the operating state of the actuator 41 based on a signal output from the actuator 41 or a measurement value of the sensor. Examples of the information regarding the operating state of the actuator 41 include information indicating the availability of the actuator 41, information indicating a monitored value of the driving force realized by the actuator 41, and the like. The information regarding the operating state of the actuator 41, which is acquired by the powertrain control unit 31, is acquired by the instruction output unit 22.

The brake control unit 32 controls the actuator 42 that is one of the brake actuators and that actuates the brake device provided in each wheel (for example, controls four wheels independently or controls two left wheels and two right wheels independently), so that the braking force instructed by the instruction output unit 23 is generated. The brake actuator includes a hydraulic brake that can distribute the braking force between the right and left wheels and a regenerative brake such as an in-wheel motor (IWM). The brake control unit 32 is realized by, for example, a brake control ECU. An output value of a wheel speed sensor provided in each wheel is input to the brake control unit 32. Further, the brake control unit 32 acquires information regarding the operating state of the actuator 42 based on a signal output from the actuator 42 or a measurement value of the sensor. Examples of the information regarding the operating state of the actuator 42 include information unique to the actuator 42 such as whether the temperature of a brake pad is shifting toward overheating, in addition to the information indicating the availability described above and the information indicating a monitored value of the braking force realized by the actuator 42. The information regarding the operating state of the actuator 42 acquired by the brake control unit 32 is acquired by the instruction output unit 23.

The steering control unit 33 controls the steering angle of the steering wheel by controlling the actuator 43 that is one of the steering actuators and that is included in the electric power steering (EPS) system. The steering control unit 33 is realized by, for example, a power steering control ECU. Further, the steering control unit 33 acquires information regarding the operating state of the actuator 43 based on a signal output from the actuator 43 or a measurement value of the sensor. Examples of the information regarding the operating state of the actuator 43 include the information indicating the availability described above, the information indicating a monitored value of the steering angle realized by the actuator 43, and the like. The information regarding the operating state of the actuator 43 acquired by the steering control unit 33 is acquired by the instruction output unit 24.

The actual steering wheel angle derivation unit 25 derives an actual steering wheel angle, which is the current actual steering wheel angle of the vehicle, based on the information indicating the movement state of the vehicle. The movement state of the vehicle is, for example, at least one of the lateral acceleration and the yaw rate, the vehicle speed, and the vehicle body slip angle. These pieces of information can be acquired from various sensors provided in the vehicle, such as a vehicle speed sensor, an acceleration sensor, and a yaw rate sensor, or can be appropriately derived based on the values acquired from the various sensors. The actual steering wheel angle derivation unit 25 derives a tire turning angle of the steered wheel from these pieces of information and the wheel base unique to the vehicle. The actual steering wheel angle derivation unit 25 further derives the actual steering wheel angle by multiplying the derived tire turning angle of the steered wheel by a conversion coefficient, which is unique to the vehicle, converted from the tire turning angle of the steered wheel to the steering wheel angle. Such information unique to the vehicle may be stored in advance in the actual steering wheel angle derivation unit 25, or may be acquired from another device included in the vehicle. The method for deriving the actual steering wheel angle is not limited as long as the actual steering wheel angle can be derived based on the movement state of the vehicle.

The steering wheel angle is the rotation angle of the steering wheel, and the actual steering wheel angle can also be directly acquired from a steering wheel angle sensor provided on the steering wheel. However, in general, the steering wheel angle sensor must be used for control after learning the midpoint of the steering wheel angle, and the entire steering system including the steering wheel has deflection and play permitted in the specifications. Thus, there is an error in the output value of the steering wheel angle sensor, and the output value may not appropriately incorporate the actual movement state of the vehicle. Therefore, using the steering wheel angle sensor may not be suitable for feedback control as described below. In the present embodiment, the actual steering wheel angle derivation unit 25 can derive the actual steering wheel angle that suitably incorporates the movement state of the vehicle based on the actual movement state of the vehicle.

The actual steering wheel angle derivation unit 25 can output the derived actual steering wheel angle and can appropriately provide the derived actual steering wheel angle to the control requesting units 11 to 13. For example, of the control requesting units, the actual steering wheel angle is provided to the control requesting unit that outputs the control command for requesting steering and for which the requested value is represented by the steering wheel angle.

Control

With further reference to FIG. 2, a steering control process executed by the vehicle control device 20 according to the present embodiment will be described. FIG. 2 is a flowchart illustrating the steering control process executed by the vehicle control device 20. The steering control process shown in FIG. 2 can be executed in a predetermined cycle, for example. As described above, the vehicle control device 20 performs not only lateral movement control such as steering but also movement control in the traveling direction such as acceleration and deceleration. Here, steering control will be described.

Here, as an example, the control requesting unit 11 is a driver assistance device that executes a lane keeping assist function and outputs a required value of the steering amount represented by the steering wheel angle as a control command that requests steering. The control requesting units 12 and 13 can also output a required value of the steering amount represented by the steering wheel angle, the lateral acceleration, the yaw rate, and the like as a control command that requests steering for executing a collision avoidance function or the like.

Step S201: The arbitration unit 21 of the vehicle control device 20 acquires the steering angle, the yaw rate, and the like as the control commands output from the control requesting units 11 to 13, and arbitrates the acquired control commands. When there is only one control command acquired from the control requesting units 11 to 13 within a certain standby time, this control command is adopted as the control command after arbitration. Here, as an example, the arbitration unit 21 selects the control command output from the control requesting unit 11 and outputs the selected control command as the control command after arbitration.

Step S202: The instruction output unit 24 of the vehicle control device 20 causes the steering control unit 33 to perform control such that the actuator 43 that is the steering actuator generates a steering angle based on the control command after arbitration. If necessary, the instruction output unit 24 converts the required value included in the control command into a physical quantity or a unit that the steering control unit 33 can accept.

Step S203: As described above, the actual steering wheel angle derivation unit 25 of the vehicle control device 20 acquires the information that represents the movement state of the vehicle, such as the lateral acceleration, the yaw rate, the vehicle speed, the vehicle body slip angle, and the like, and based on this information, derives the actual steering wheel angle, which is the current actual steering wheel angle of the vehicle.

Step S204: The actual steering wheel angle derivation unit 25 of the vehicle control device 20 outputs the derived actual steering wheel angle. In the present embodiment, the current steering control is performed based on the control command output from the control requesting unit 11, so the control requesting unit 11 acquires the actual steering wheel angle. Thus, the steering control process ends.

The control requesting unit 11 performs feedback control using the acquired actual steering wheel angle and determines the control command to be output next. For example, when there is a difference between the required value of the steering wheel angle included in the control command and the acquired actual steering wheel angle, the control requesting unit 11 can change the required value of the steering wheel angle included in the next control command so as to eliminate the difference.

In the present embodiment, the actual steering wheel angle derivation unit 25 of the vehicle control device 20 derives the actual steering wheel angle, and the control requesting unit 11 acquires the actual steering wheel angle. In addition to this, the vehicle control device 20 may include derivation units that each derive the yaw rate, the lateral acceleration, and the like of the vehicle. The control requesting units 12 and 13 can appropriately acquire a suitable one of the actual steering wheel angle, the yaw rate, the lateral acceleration, and the like from each derivation unit and can use the acquired information for steering control depending on the physical quantity and the unit included in the requested value included in each control command, or depending on the physical quantity and the unit used in the execution process of the application. Note that each of the control requesting units may directly acquire from the sensors values that can be acquired relatively accurately from the sensors such as the yaw rate and the lateral acceleration.

Operations and Effects

As described above, the vehicle control device according to the present embodiment can provide the actual steering wheel angle of the vehicle to the control requesting unit (driver assistance device). The driver assistance device can acquire the actual steering wheel angle as a feedback to the control command and determine the next control command based on the acquired actual steering wheel angle. This improves the steering accuracy and the control stability, thereby improving the riding comfort. Further, when the state where the steering control is performed by one driver assistance device is switched to the state where the steering control is performed by another driver assistance device as a result of the arbitration, the other driver assistance device can promptly acquire the actual steering wheel angle. Therefore, the steering control can be smoothly taken over before and after switching.

In the case of normal safe driving in which the influence of the vehicle body slip angle can be ignored, the value of the actual steering wheel angle derived based on the movement state of the vehicle incorporates the movement state of the vehicle more accurately than the output value of the steering wheel angle sensor does, and thus can be suitably used for steering control. However, in order to derive the actual steering wheel angle based on the movement state of the vehicle, it is necessary to perform a relatively high-level calculation based on the characteristics unique to the vehicle. Thus, a configuration in which the control requesting units individually mount and execute such derivation processes increases development cost and processing load. In the present embodiment, the vehicle control unit is provided with the actual steering wheel angle derivation unit 25 that provides an actual steering wheel angle that is particularly difficult to derive, so that the development cost and the processing load of the control requesting units can be suppressed.

In the embodiment described above, the actual steering wheel angle derivation unit 25 derives the actual steering wheel angle after the control of the actuator 43 by the instruction output unit 24 and the steering control unit 33 based on the control command from the control requesting unit 11, and provides the actual steering wheel angle to the control requesting unit 11 as a feedback to the control command. Alternatively, the control requesting unit 11 may request the actual steering wheel angle at a desired timing, and based on this request, the actual steering wheel angle derivation unit 25 may derive the actual steering wheel angle and provide the actual steering wheel angle to the control requesting unit 11. For example, in the initial operation, the control requesting unit 11 can acquire the current actual steering wheel angle before determining the control command, and determine the first control command based on the actual steering wheel angle, thereby performing more stable steering control. As described above, the trigger and the timing for deriving and acquiring the actual steering wheel angle are not limited.

Although the embodiment of the technique of the present disclosure has been described above, the technique of the present disclosure can be construed as a vehicle control device, a control method performed by a vehicle control device including a processor and a memory, a control program for performing a control method, a computerreadable non-transitory storage medium that stores a control program, a system including a vehicle control device, control requesting units, actuator control units, and actuators, or a vehicle equipped with a vehicle control device.

The disclosure can be used for a vehicle control device that controls the movement of the vehicle.

The disclosure can be also used as the following aspects. A vehicle control device according to another aspect of the present disclosure includes one or more processors. The one or more processors are configured to arbitrate a plurality of control commands acquired from a plurality of driver assistance devices each realizing a driving support function. The one or more processors are configured to output a control command for controlling at least a steering actuator based on an arbitration result. The one or more processors are configured to acquire information that represents a movement state of a vehicle. The one or more processors are configured to derive an actual steering wheel angle of the vehicle based on the acquired information. The one or more processors are configured to provide the derived actual steering wheel angle to the driver assistance devices.

According to the vehicle control device of above aspect of the present disclosure, the actual steering wheel angle that incorporates the movement state of the vehicle and that can be suitably used for steering control can be derived and provided to the driver assistance devices. Thus, the steering control performed by the driver assistance devices can be improved.

In the vehicle control device according to above aspect of the present disclosure, the one or more processors may be configured to, when the one or more processors acquire, from a driver assistance device included in the plurality of driver assistance devices, a control command requesting steering represented by a steering wheel angle, provide the derived actual steering wheel angle to the driver assistance device that has output the control command requesting the steering represented by the steering wheel angle. In the vehicle control device according to above aspect of the present disclosure, the one or more processors may be configured to derive the actual steering wheel angle based on the information that represents the movement state of the vehicle after the control command is output based on the control command requesting the steering represented by the steering wheel angle. In the vehicle control device according to above aspect of the present disclosure, the one or more processors may be configured to acquire at least one of a lateral acceleration and a yaw rate, a vehicle speed, and a vehicle body slip angle as the information that represents the movement state of the vehicle. In the vehicle control device according to above aspect of the present disclosure, the vehicle control device may be mounted on the vehicle.

A vehicle control method according to another aspect of the present disclosure is executed by a computer of a vehicle control device. The vehicle control method includes: arbitrating a plurality of control commands acquired from a plurality of driver assistance devices each realizing a driving support function; outputting a control command for controlling at least a steering actuator based on an arbitration result; acquiring information that represents a movement state of a vehicle; deriving an actual steering wheel angle of the vehicle based on the acquired information; and providing the actual steering wheel angle to the driver assistance devices.

A non-transitory storage medium according to another aspect of the present disclosure stores instructions that are executable by one or more processors and that cause the one or more processors to perform the following functions. The functions include: arbitrating a plurality of control commands acquired from a plurality of driver assistance devices each realizing a driving support function; outputting a control command for controlling at least a steering actuator based on an arbitration result; acquiring information that represents a movement state of a vehicle; deriving an actual steering wheel angle of the vehicle based on the acquired information; and providing the actual steering wheel angle to the driver assistance devices.

What is claimed is:

1. A manager mounted on a vehicle comprising one or more processors configured to:
    receive a plurality of kinematic plans from a plurality of ADAS applications;
    arbitrate the kinematic plans;
    calculate a motion request based on an arbitration result;
    distribute the motion request to at least one of a plurality of actuator systems; and
    output a steering wheel angle of the vehicle to the ADAS applications.

2. A method to be executed by a computer of a manager mounted on a vehicle, the method comprising:
    receiving a plurality of kinematic plans from a plurality of ADAS applications;
    arbitrating the kinematic plans;
    calculating a motion request based on an arbitration result;
    distributing the motion request to at least one of a plurality of actuator systems; and
    outputting a steering wheel angle of the vehicle to the ADAS applications.

3. A non-transitory storage medium storing instructions that are executable by a computer of a manager mounted on a vehicle and that cause the computer of the manager to perform functions comprising:
    receiving a plurality of kinematic plans from a plurality of ADAS applications;
    arbitrating the kinematic plans;
    calculating a motion request based on an arbitration result;
    distributing the motion request to at least one of a plurality of actuator systems; and
    outputting a steering wheel angle of the vehicle to the ADAS applications.

4. A vehicle equipped with the manager according to claim 1.

* * * * *